US009336525B2

(12) United States Patent
Singh et al.

(10) Patent No.: US 9,336,525 B2
(45) Date of Patent: May 10, 2016

(54) METHOD AND APPARATUS FOR ENABLING DYNAMIC ANALYTICS CONFIGURATION ON A MOBILE DEVICE

(71) Applicant: Adobe Systems Incorporated, San Jose, CA (US)

(72) Inventors: Harpreet Singh, Chandigarh (IN); Salil Taneja, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 238 days.

(21) Appl. No.: 14/043,325

(22) Filed: Oct. 1, 2013

(65) Prior Publication Data

US 2015/0095471 A1  Apr. 2, 2015

(51) Int. Cl.
G06F 15/177 (2006.01)
G06Q 30/00 (2012.01)
G06F 9/44 (2006.01)
G06F 9/445 (2006.01)

(52) U.S. Cl.
CPC ........ *G06Q 30/00* (2013.01); *G06F 9/44* (2013.01); *G06F 9/44505* (2013.01)

(58) Field of Classification Search
USPC .............. 702/19; 708/445; 726/1, 2; 709/221
See application file for complete search history.

(56) References Cited

U.S. PATENT DOCUMENTS 8,966,569 B2 * 2/2015 Schwartz et al. ................. 726/1
2007/0244650 A1 * 10/2007 Gauthier ......................... 702/19

\* cited by examiner

*Primary Examiner* — Kyung H Shin
(74) *Attorney, Agent, or Firm* — Keller Jolley Preece (57) ABSTRACT

A computer implemented method and apparatus for enabling dynamic analytics configuration on a mobile device. generating a mobile application, which mobile application, when executed on a mobile device, includes accessing of instructions for analytics data collection, which instructions are accessed from a location remote from the mobile device executing the mobile application, and which instructions are modifiable without modification to the mobile application, thereby enabling dynamic analytics configuration on the mobile device.

20 Claims, 5 Drawing Sheets

METHOD AND APPARATUS FOR ENABLING DYNAMIC ANALYTICS CONFIGURATION ON A MOBILE DEVICE

BACKGROUND

1. Field of the Invention

Embodiments of the present invention generally relate to analytics collection and, more particularly, to a method and apparatus for enabling dynamic analytics configuration on a mobile device.

2. Description of the Related Art

Web analytics allows marketers to collect session-level information about user interactions on a website. Analytics may also be collected from mobile applications and mobile sites. Analytics collected from mobile applications allows a marketer or mobile application provider to measure metrics such as user engagement and outcome of mobile application use. In order to collect analytics, a marketer informs a software developer what analytics are required for the mobile application. The software developer develops the mobile application, and incorporates all of the analytics requirements in the mobile application, such that the mobile application collects the required analytics data in an analytics library portion of the mobile application. The mobile application is then submitted to an application store (sometimes also referred to as an application store, application marketplace, or other variation), which is a type of digital distribution platform for application software. Thereafter, the mobile application is available from the application store for a user to download to their mobile device as an addition to their operating system. As the mobile application is used, the analytics library collects the analytics data the marketer required. When the marketer reviews the collected analytics data received from the use of the mobile application, the marketer may decide to modify the analytics library configuration in order that the analytics library collect different data from the user interaction with the mobile application. Changes in the analytics library configuration require the marketer to go back to the software developer and repeat the process by updating the mobile application, compiling, testing and then re-deployment of the mobile application to the application store. Current users must then download the updated mobile application and the process iterates until the marketer is satisfied with the collected analytics. Involvement of a software developer in addition to the marketer is a development process from updating, through redistribution that is both costly and time consuming.

Therefore, there is a need for a method and apparatus for enabling dynamic analytics configuration on a mobile device.

SUMMARY

A method and apparatus for enabling dynamic analytics configuration on a mobile device, substantially as shown in and/or described in connection with at least one of the figures, and as set forth more completely in the claims, is provided. The method generates a mobile application, that when executed on a mobile device, accesses instructions for analytics data collection. The instructions are accessed from a location remote from the mobile device executing the mobile application, and are modifiable without modification to the mobile application. Hence, dynamic analytics configuration is enabled on the mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

While the method and apparatus is described herein by way of example for several embodiments and illustrative drawings, those skilled in the art will recognize that the method and apparatus for enabling dynamic analytics configuration on a mobile device is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for enabling dynamic analytics configuration on a mobile device defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, the word "configure" and "configuration" is used herein to refer to the setting of parameters of a software application, such as the setting of the parameters of an analytics library, which parameters define the events that are to be captured and what data are to be collected upon such capture.

DETAILED DESCRIPTION OF EMBODIMENTS

Embodiments of the present invention include a method and apparatus for enabling dynamic analytics configuration on a mobile device. A mobile application is generated which, when executed on a mobile device, accesses instructions for analytics data collection. The instructions are accessed from a location remote from the mobile device executing the mobile application, and are therefore modifiable without modification to the mobile application, thereby enabling dynamic analytics configuration on the mobile device.

The mobile application determines the remote location of the instructions for analytics data collection. The mobile application collects analytics data per said instructions. When the instructions for analytics collection are modified and stored at the remote location, the mobile application continues to collect analytics data, but not the mobile application collects the analytics data per the modified instructions.

Advantageously, applications that provide analytics services, such as ADOBE® REAL-TIME ANALYTICS®, as part of ADOBE® Marketing Cloud, can provide a dynamic analytics with a seamless user experience. Marketers are able to collect analytics from mobile applications such as ADOBE® Mobile Client, ADOBE® CONNECT™ Mobile, Photoshop.com Mobile, SITECATALYST®, ACROBAT® READER® Mobile, and the like, without impacting the end user experience. No changes to the mobile application are required when a marketer decides to modify what analytics are to be collected. The mobile application does not need to be resubmitted to the application store. As such, users do not need to update the mobile application simply because the analytics library configuration has changed. Marketers may modify the analytics library configuration file and have changes take effect in real time, without the involvement of software developers. Once a software developer includes a line of code in the mobile application that includes the first and second parameters, the software developer no longer needs to be involved with any analytics related issues.

Various embodiments of a method and apparatus for enabling dynamic analytics configuration on a mobile device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
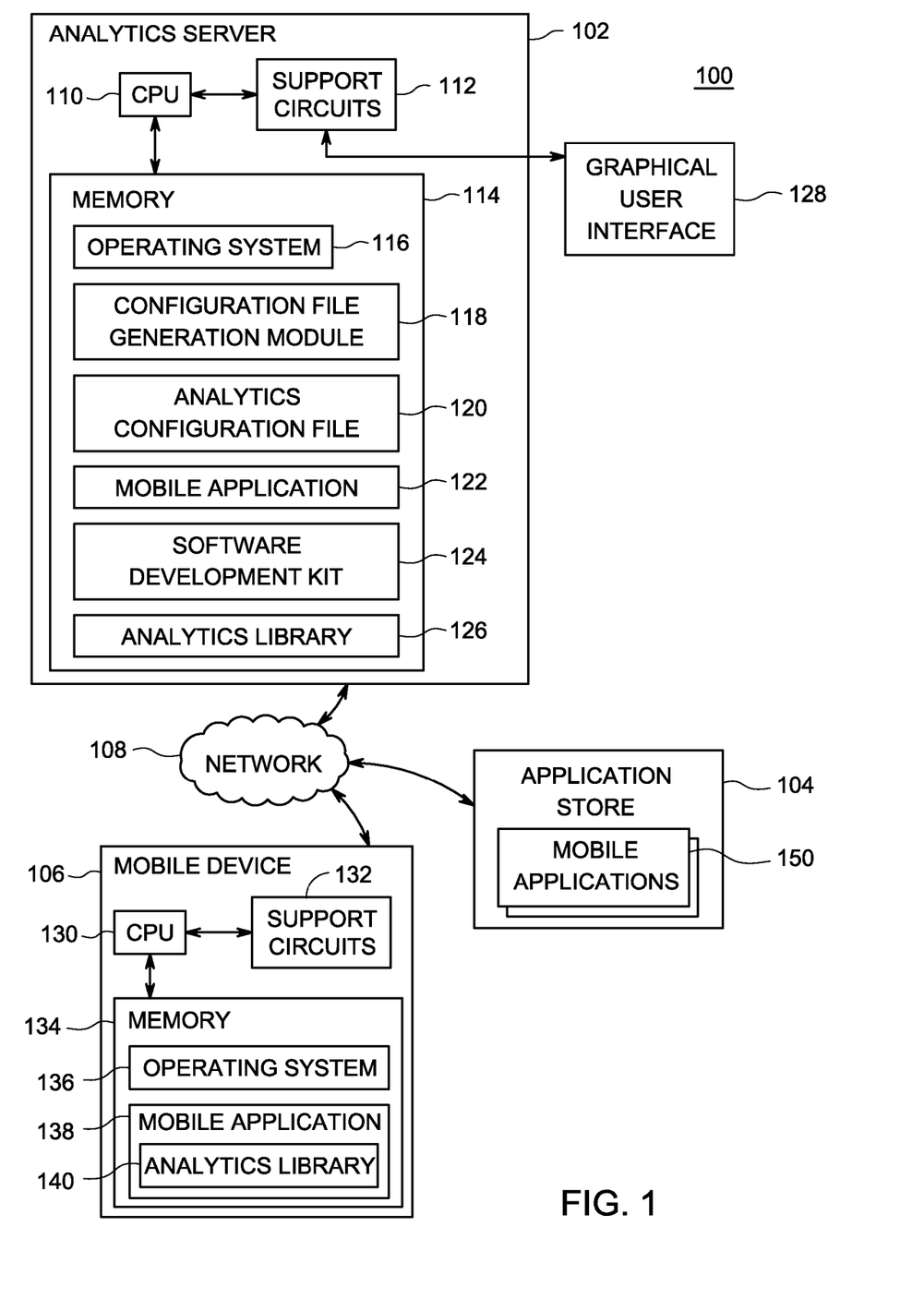
FIG. 1 is a block diagram of an apparatus for enabling dynamic analytics configuration on a mobile device, according to one or more embodiments.

FIG. 1 is a block diagram of an apparatus 100 for enabling dynamic analytics configuration on a mobile device, according to one or more embodiments. The apparatus 100 includes an analytics server 102, an application store 104, and a mobile device 106, communicatively connected to one another via a network 108. The analytics server 102 is a computing device, such as a desktop computer, laptop, tablet computer, and the like that includes or is attached to a graphical user interface (UI) 128. The analytics server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a configuration file generation module 118, an analytics configuration file 120, a mobile application 122, an analytics library 126 and a software development kit (SDK) 124. The operating system 116 may include various commercially known operating systems. The mobile application 122 may be any mobile application 122, such as PHOTOSHOP® Mobile, capable of being analytics enabled. As will be described in greater detail below, analytics library 126 implements dynamic analytics collection by the mobile application 122 by use of the analytics configuration file 120 for capturing analytics data.

The mobile device 106 is a computing device, for example, a tablet computer, mobile phone, and the like, capable of running a mobile application 138. The mobile device 106 includes a Central Processing Unit (CPU) 130, support circuits 132, and a memory 134. The CPU 130 may include one or more commercially available microprocessors or microcontrollers that facilitate data processing and storage. The various support circuits 132 facilitate the operation of the CPU 130 and include one or more clock circuits, power supplies, cache, input/output circuits, and the like. The memory 134 includes at least one of Read Only Memory (ROM), Random Access Memory (RAM), disk drive storage, optical storage, removable storage and/or the like. The memory 134 includes an operating system 136 a mobile application 138. The mobile application 138 includes an analytics library 140.

The application store 104 is an e-commerce repository of mobile applications 150. The mobile applications 150 may be purchased and installed on the mobile device 106.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

When the mobile application 122 is developed using the SDK 124, the mobile application 122 includes a line of source code that includes two parameters. A first parameter identifies a location for accessing instructions for analytics data collection, which instructions are used by an analytics library 126 linked with the mobile application to cause collection of the analytics data. A second parameter is a location for where to send the collected analytics data. The analytics library 126 uses the first parameter indicating where an analytics configuration file 120 may be accessed, which analytics configuration file 120 specifies what analytics are to be collected, as well as uses the second parameter indicating where to send the collected analytics data after collection. Once a mobile application 150 from application store 104 is installed on a mobile device 106, the installed analytics library 140 included in installed mobile application 138 captures all of the events of the mobile application 138. One or more of the captured events are events for which a marketer would like to collect data. The marketer uses the configuration file generation module 118 to specify what events are to be captured and what data are to be collected when the event is captured. For example, in an e-commerce mobile application, a marketer may want to capture an event, such as when a user clicks on an "Add to Cart" button. The data the marketer may want collected may be a product id for the item that the user chose to "Add to Cart".

In some embodiments, the mobile application 122 is executed in a simulation mode, wherein events occurring during the simulated execution of the mobile application may be selected by a marketer for analytics data collection. Upon selection of such events, the configuration file generation module 118 generates the analytics configuration file 120. Further details of this embodiment are described in conjunction with FIG. 5. In other embodiments, a marketer may specify to a software developer what analytics are required and the software developer then manually creates a custom analytics configuration file 120. In either case, the analytics specified by the marketer are stored in the analytics configuration file 120, which in some embodiments, may be an XML file. The SDK 124 may be used to compile the mobile application 122 with the analytics library 126 and upload the mobile application 122 containing the analytics library 126 to the application store 104, where it is stored as a mobile application 150. Thus, the analytics library 126 is packaged/embedded with the mobile application 150. The mobile application 150 is downloaded onto the mobile device 106 and stored as the mobile application 138 containing the analytics library 140. It is noted that for simplicity of illustration, only an analytics server 102 is shown for developing the basic mobile application 122 and its portions for causing it to become analytics enabled, however, in practice, the creation of the mobile application 122 and the creation of the analytics library 126, as well as the compiling of the mobile application 122 with the analytics library 126, and even the creation of the analytics configuration file 120, may all take place at a server or servers that are different from the analytics server 102.

When the mobile application 138 executes on the mobile device 106, the mobile application 138 accesses the analytics library 140. The analytics library 140 provides the location of the analytics configuration file 120 on the analytics server 102. The analytics library 140 also provides a location of where to send analytics that are collected in accordance with the analytics configuration file 120. The analytics configuration file 120 includes actions or events from which to collect data. Analytics are collected by the analytics library 140 according to the analytics configuration file 120 and sent to the analytics server 102 specified in the analytics library 140. Although in the described embodiments, the location of the analytics configuration file 120 and the location of where to send the collected analytics is on the analytics server 102, such locations may be at a server or servers that are different from the analytics server 102.

A marketer may review the collected analytics and use the configuration file generation module 118 to modify the actions or events from which he or she would like to collect analytics. The modified actions/events are stored in the analytics configuration file 120. The analytics configuration file 120 is modified and stored on the server 102. The analytics library 140 continues to access the analytics configuration file 120, which now includes the modified events from which to collect analytics. The mobile application 138 and the analytics library 140 on the mobile device 106 remain unchanged and therefore need not be updated and re-downloaded from the application store 104 to the mobile device 106 in order for the modified analytics configuration file 120 to take effect. Thus, the analytics configuration file 120 is a dynamic file that may be modified as many times as suits the marketer without requiring input from a software developer. Additionally, because the mobile application 122 does not require modification in order to change what analytics are collected, the mobile application 122 need not be recompiled, tested, and redeployed to the application store 104. As such, the mobile application 138 need not be updated on the mobile device 106. Hence, analytics modification is performed without impacting the user and in a low-cost and time-efficient manner by the marketer.

Figure 2:
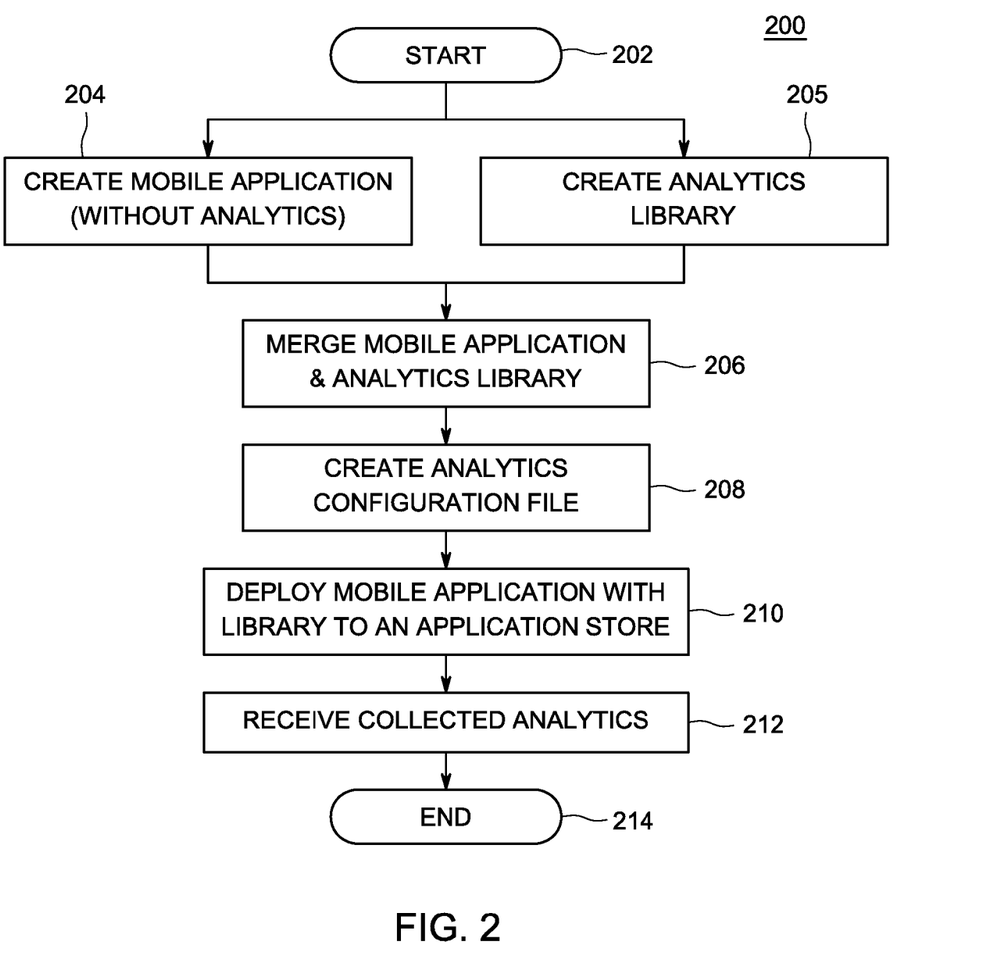
FIG. 2 is a flowchart of a method for dynamically configuring analytics as performed by the configuration file generation module and the software development kit of FIG. 1, according to one or more embodiments.

FIG. 2 is a flowchart of a method 200 for dynamically configuring analytics, as performed by the configuration file generation module 118 and the software development kit 124 of FIG. 1, according to one or more embodiments. The method 200 prepares a mobile application, an analytics library, and an analytics configuration file such that the analytics configuration may be modified without impacting the mobile application or analytics library. The method 200 starts at step 202 and proceeds independently to steps 204 and 205.

At step 204, the method 200 creates a mobile application. The method 200 includes a line of source code in the mobile application that makes the mobile application analytics-enabled, that is, aware that analytics are to be collected. In order to make the mobile application analytics-enabled, the line of source code includes a parameter that identifies a location for accessing instructions for analytics data collection, which instructions form an analytics configuration file used by an analytics library linked with the mobile application to cause collection of the analytics data. A second parameter is included in the line of source code that identifies a location of where to send the collected analytics data. For example, the source code may be as follows:

[LCTracking
configureServers:@"htto://no1swu764.corp.adobe.com:4502/etc/analytics/EventTrackingConfig.plist"
analyticsServerUrl:@"10.40.54.77:50000"
analyticsServerRSID:@"aisbxBynamicAnaltyicsDemo"]

In some embodiments, the locations are defined using a Universal Resource Locator (URL). The URL of the analytics configuration file and the URL of where to send the analytics data are typically on an analytics server, where a marketer may maintain the analytics configuration file and analyze the analytics data, although in other embodiments other locations may be used.

At step 205, an analytics library is created for use by one or more mobile applications, to cause collection and reporting of analytics data. The analytics library itself, however, is not yet configured for any specific analytics collection.

The method 200 proceeds to step 206, where the method 200 merges the mobile application created in step 204 with the analytics library created in step 205. Once merged, the analytics library uses the two parameters in the line of code in the mobile application to access an analytics configuration file, as described below.

The method 200 proceeds to step 208, where the method 200 creates the analytics configuration file. The analytics configuration file includes instructions for analytics collection, namely the events within the mobile application during which data is to be collected. In some embodiments, the analytics configuration file is an Extensible Markup Language (XML) file. In some embodiments, the method 200 creates the analytics configuration file manually by writing code that identifies what data to collect based on select captured events. In some embodiments, the method 200 facilitates execution of the mobile application in a simulation mode where, via a user interface, a marketer may navigate through pages of the mobile application and specify events to capture and data to collect, as illustrated with respect to FIG. 5 below.

An example of an analytics configuration file may be as follows:

```
<sampleConfig>
  <event>
    <key>Click.rootViewController.UIButton.text.Buy Now</key>
    <payload>rootviewController.Product.productId</payload>
  </event>
</sampleConfig>
```

A single event is captured in the example analytics configuration file to capture an event when a user selects a button to purchase an item that includes the text "Buy Now". The <key> field indicates that when a user clicks a "Buy Now" button in the user interface of the mobile application, that event is to be captured. When the event is captured, the data that is to be collected is provided in the <payload> field. In this example, the productId is collected.

The analytics configuration file is stored in the location specified by the URL used by the analytics library.

The method 200 proceeds to step 210, where the method 200 deploys the mobile application containing the analytics library to the application store. A user may download the mobile application containing the analytics library from the application store and use the mobile application on the user's mobile device. The method 200 proceeds to step 212, where the method 200 receives analytics data collected as specified in the analytics configuration file. How the data is collected is described in further detail with respect to FIG. 3, below. The method 200 proceeds to step 214 and ends.

A marketer may review the collected analytics data and decide that a different set of analytics are needed in order to evaluate a sales campaign or other marketing strategy.

Figure 3:
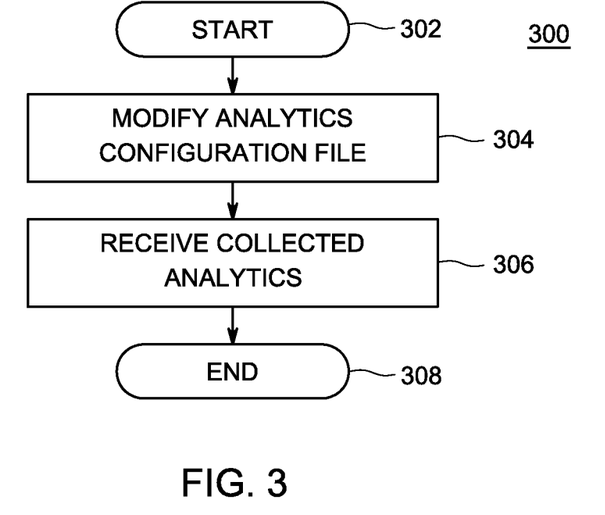
FIG. 3 is a flowchart of a method for dynamically reconfiguring analytics collection as performed by the configuration file generation module of FIG. 1, according to one or more embodiments.

FIG. 3 is a flowchart of a method 300 for dynamically reconfiguring analytics collection, as performed by the configuration file generation module 118 of FIG. 1, according to one or more embodiments.

The method 300 allows for the collection of different data by the analytics library, by modification of the analytics configuration file and without the need to modify the mobile application or its analytics library. The method 300 starts at step 302 and proceeds to step 304, where the method 300 modifies the analytics configuration file in a manner similar to how the analytics configuration file was created in step 208. As soon as the method 300 stores the modified analytics configuration file on the analytics server, the mobile application can access the analytics configuration file during its next execution of the mobile application and thereafter proceeds to capture events according to the modified analytics configuration file. No modification is needed for the mobile application or its analytics library. As such, the mobile application need not be recompiled and redeployed to the application store. In addition, there is no impact on a user of the mobile application because no update to the mobile application is needed on the mobile device of the user.

The method 300 proceeds to step 306, where the method 300 receives analytics data collected per the configuration in the modified analytics configuration file. As such, the analytics configuration file is a dynamic file that may be modified at any time without interaction from a software developer and without any modification to the mobile application. The method 300 proceeds to step 308 and ends.

Figure 4:
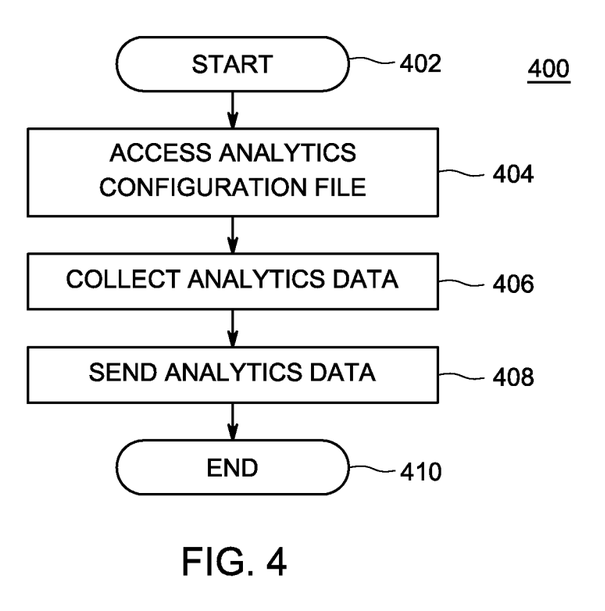
FIG. 4 is a flowchart of a method for collecting analytics, as performed by the analytics library of FIG. 1, according to one or more embodiments.

FIG. 4 is a flowchart of a method 400 for collecting analytics as performed by the analytics library 140 of FIG. 1, according to one or more embodiments. The method 400 accesses an analytics configuration file to determine what events are to be captured and what data is to be collected. The method 400 then collects and sends the data to an analytics server. The method 400 is executed when an analytics-enabled mobile application is executed on a mobile device. The method 400 starts at step 402 and proceeds to step 404.

At step 404, the method 400 accesses an analytics configuration file. A mobile application is linked to an analytics library that uses a URL provided by execution of the mobile application for identifying the location of the analytics configuration file and that uses a URL provided by execution of the mobile application for identifying the location of where to send the collected analytics data. The method 400 uses the URL information to access the analytics configuration file. The analytics configuration file includes one or more events that are to be captured and the data that is to be collected when the event occurs.

The method 400 proceeds to step 406, where the method 400 collects analytics data according to the analytics configuration file. The method 400 dynamically captures all events of the mobile application. For example, a touch on a touch screen of a mobile device triggers a touch event. However, the touch event may occur on different parts of the touch screen. A marketer may not want to collect all of the touch events, therefore the method 400 must determine if the captured event is an event that is specified in the analytics configuration file.

In some embodiments, the method 400 uses the responder chain framework of iOS for capturing events. Although the present disclosure discusses capturing events in an iOS environment, other methods of event capture and analysis may be used depending on the operating system of a mobile device on which a mobile application is installed.

Each element or area of a user interface (UI) screen is referred to as a view and every view has a view controller attached to the view or the view is itself inside another view. For example, a UI button on a user interface is an example of a view. The UI button also has a button controller, referred to as a view controller that controls what happens when the button is clicked. Many UI views may exist. For example, a user may look at a blouse in an e-commerce mobile application. The window where the blouse is displayed may include one or more color choices, a size choice, and a button, such as a "Buy Now" button, used when the user wishes to purchase the blouse. A marketer may not want to capture when a user clicks on the different color choices or selects a size. The marketer may only wish to capture when the user clicks on the "Buy Now" button. However, each click is captured, and each clickable item is a "view", and each view has a view controller. There exists a hierarchy of views within a given window, with the mobile application window as the top of the hierarchy, and the window's controller referred to as a root view controller. When an event is captured, the method 400 locates the relevant view controller within this hierarchy to determine whether it is associated with the event specified in the analytics configuration file.

In the exemplary analytics configuration file above, the method 400 needs to capture the events associated with the click of a "Buy Now" button. The method 400 matches the information in a captured touch event with information included in the analytics configuration file. The following pseudo code describes the steps used by method 400 to determine if the captured event is an event that is specified in the analytics configuration file, specifically, for a touch event on a UI button, where the UI button includes the text "Buy Now":

```
<pseudo-code>
rootViewControllerObject = touchEvent.view;
if (rootViewControllerObject respondsToSelector: @"UIButton") {
    UIButton * buttonObj = [rootViewControllerObject preformSelector: @"UIButton"];
    if ([buttonObj respondsToSelector: @"text"]) {
        if ([buttonObj performSelector: @"text"]== @"Buy Now") {
            "Yes I want to record this event!!"
        }
    }
}
</pseudo-code>
```

The method 400 uses a reflection principle common in programming languages, which enables the method 400 to determine attributes and data associated with an object at runtime. Stepping through the above pseudo code, the method 400 verifies that the captured event corresponds to a touch event. Next, the method 400 determines if the element being selected is a UI button. If so, the method 400 gets the reference of the button object, checks if the button object has a property label, and if the label reads "Buy Now", then the method 400 determines that this event is an event for which analytics data is to be collected.

The method 400 proceeds to step 408, where the method 400 sends the analytics data (along with the event being captured) to a location specified by the fore noted URL. After the method 400 determines that the event is an event for which data is to be collected, the method 400 collects the data that is specified in the analytics configuration file. As per the exemplary analytics configuration file, the payload for clicking on the "Buy Now" UI button is the product id of the product being shown. The method 400 obtains the productId for a Product attribute in rootviewcontroller as described in the following pseudo code:

```
<pseudo-code>
rootViewControllerObject = touch Event.view;
if (rootViewControllerObject respondsToSelector: @"product") {
    Product* productObj = [rootViewControllerObject preformSelector: @"product"];
    if ([productObj respondsToSelector: @"productId"]) {
        payLoad = [productObj preformSelector: @"productId"];
        [analyticsLibrary sendPayloadtoServer:payload];
    }
}
</pseudo-code>
```

Stepping through the pseudo-code, the method 400 verifies that the trapped event is a touch event, and ensures that the viewcontroller is "product". The method 400 then gets a reference to the product object, ensures the product object has a product id and sends the product id to the location specified by the analytics library.

The location is specified by a URL and is typically a location on an analytics server. In some embodiments, the data is sent to a third party analytics service that analyzes the analytics before it is sent to the analytics server. The method 400 proceeds to step 410 and ends.

Figure 5A:
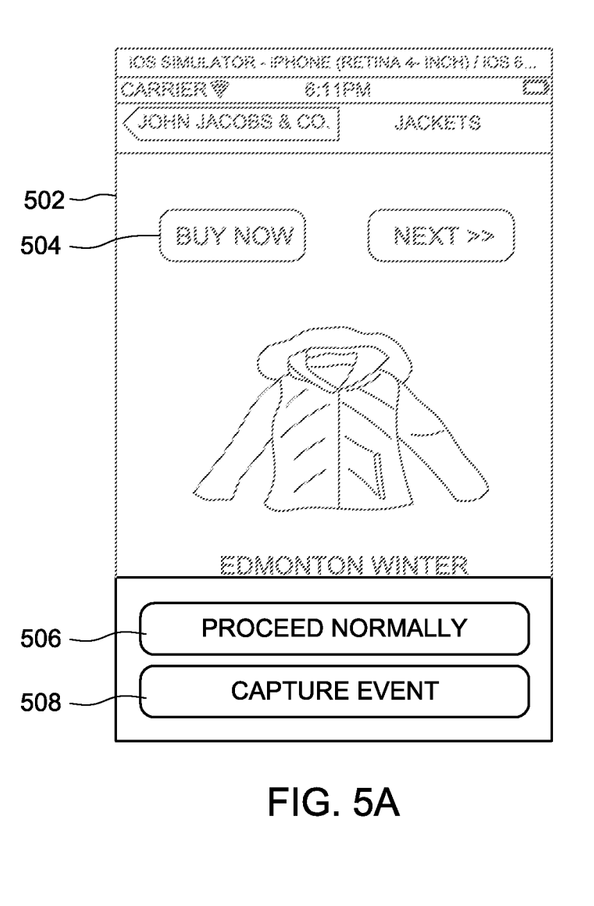
FIGS. 5A-5C illustrate a User Interface (UI) tool for generating an analytics library configuration file, according to one or more embodiments.
Figure 5B:
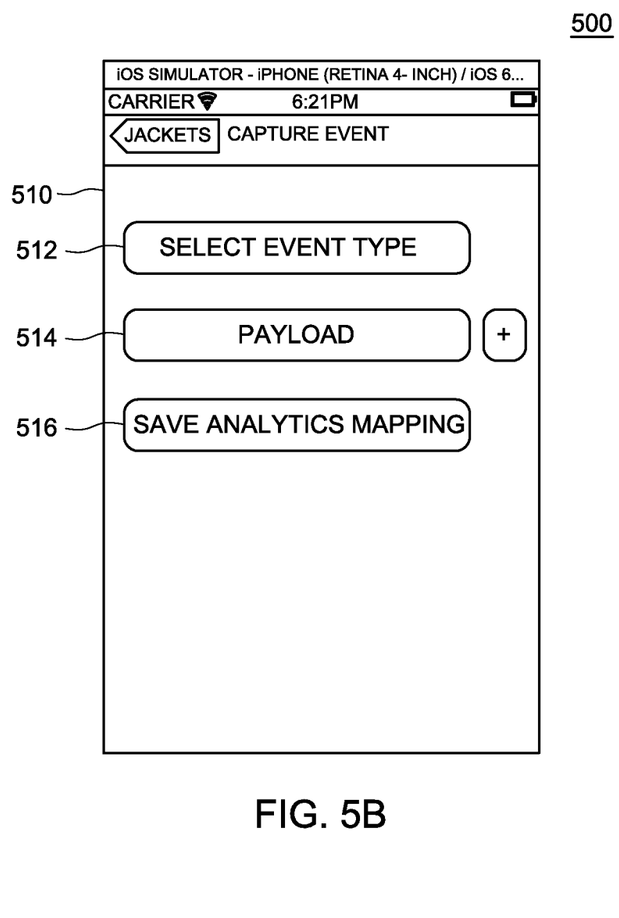
Figure 5C:
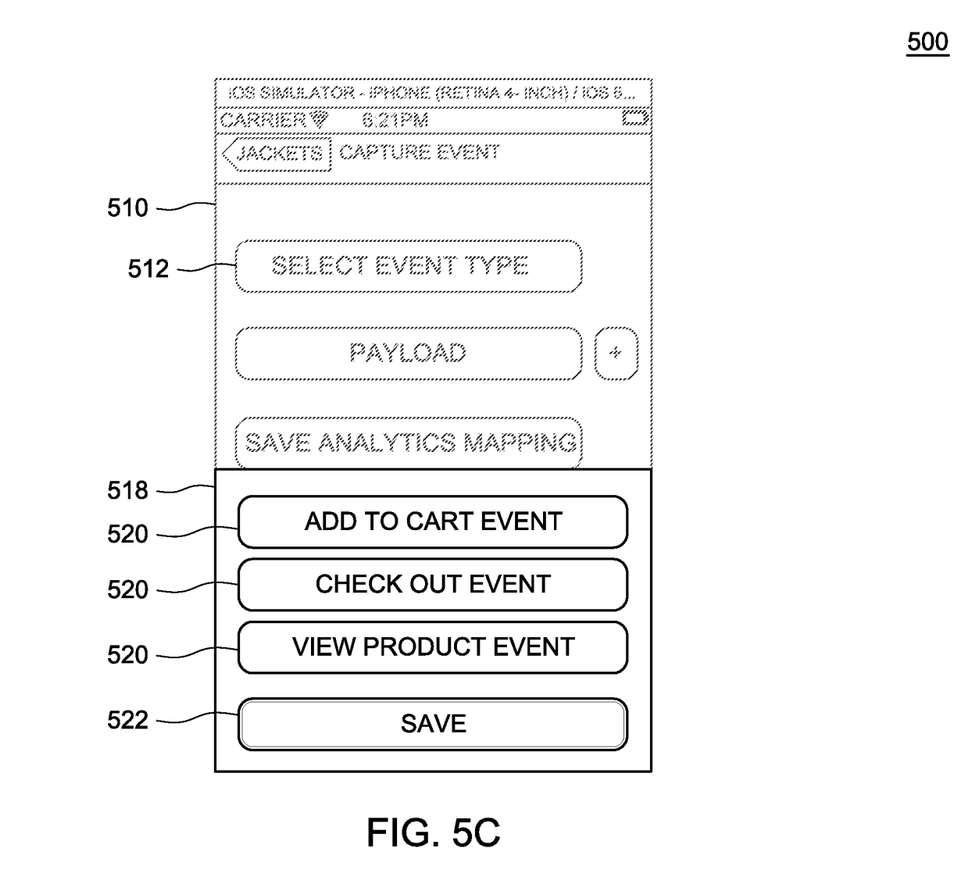

FIGS. 5A-5C illustrate a UI tool 500 for generating an analytics configuration file, according to one or more embodiments. FIG. 5A illustrates a window 502 of a mobile application that is being executed in a custom mode. A custom mode can be a simulation mode or any other mode provided by Mobile OS SDK/tools. For example, an iOS provides different provisioning profiles which can be used to create different variants of the same application. The marketer's IT department can create a custom profile, such as a "marketing provision profile", and configure the analytics library to generate an analytics configuration file for this provisioning profile. The application created with this provisioning profile can be used by the marketer to generate/update the analytics configuration file.

The window 502 includes a UI button 504 with a label "Buy Now". Because the mobile application is running in simulation mode for specifying analytics that are to be collected, the window 502 also includes a button 506, used if the "Buy Now" event is not to be captured, and button 508, used if the "Buy Now" event is to be captured.

FIG. 5B illustrates a window 510 that is presented when an event is to be captured, according to one or more embodiments. The window 510 appears when, for example, the button 508 from FIG. 5A is selected in order to capture the "Buy Now" event. The window 510 includes a button 512, used for selecting an event type, button 514, used for selecting the payload (data) for the chosen event type, and button 516, used for saving the analytics mapping.

FIG. 5C illustrates the window 510 of FIG. 5B after button 512 is selected such that an event type may be selected. A menu 518 is displayed that includes buttons 520 for different events that may be captured. When a button 520 for an event is selected, a menu of possible payloads may be displayed and optionally selected. In this example, three events are selectable, namely "Add to Cart Event", "Check out Event", and "View Product" Event". After one of these is selected, a marketer may select the "Payload" button 514 in FIG. 5B to specify a payload, or specific data that the marketer may which to collect. When the marketer has finished specifying the event and payload, the marketer selects the save button 522, which causes the generation of the analytics configuration file. In some embodiments, the analytics configuration file is an XML file.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
receiving a request to modify an analytics configuration file comprising instructions for analytics data collection, which instructions are stored at a location remote from a computing device executing an application;
modifying the instructions in the analytics configuration file without modification to the application, thereby enabling dynamic analytics configuration on the computing device; and
receiving, from the application executed at the computing device, analytics data collected by the application at the computing device according to the instructions in the analytics configuration file.

2. The method of claim 1, wherein the instructions in the analytics configuration file define a first plurality of analytics to be collected from the application.

3. The method of claim 2, wherein the request to modify the analytics configuration file comprises a request to modify the analytics configuration file so as to define collection of a second plurality of analytics, wherein modifying causes the second plurality of analytics to be collected without modification or redeployment of the application.

4. The method of claim 2, further comprising wherein:
the request to modify the analytics configuration file comprises a request to access the analytics configuration file at a Universal Resource Locator (URL) that defines a location of the analytics configuration file.

5. The method of claim 1, wherein the instructions specify one or more events to capture and data to be collected when the specified one or more events is captured.

6. The method of claim 5, wherein the request is received from a user accessing a User Interface (UI) tool when executing the application in a simulation mode in order to graphically indicate what events are to be captured.

7. The method of claim 6, wherein when the application is navigated in simulation mode, the UI tool:
displays menu items for one or more events that are selectable to be captured;
receives input of a selection of an event to capture;
displays a menu for what payload to collect from the selected event; and
upon receiving a selection to save one or more selected events and payloads, generates the analytics configuration file.

8. An apparatus for enabling dynamic analytics configuration on a mobile device comprising:
at least one processor; and
at least one non-transitory computer-readable storage medium storing computer-readable instructions thereon that, when executed by the at least one processor, cause the apparatus to:
access, by a mobile application executed on a mobile device, an analytics configuration file from a location specified by the mobile application and remote from the mobile device that executes the mobile application, wherein the analytics configuration file comprises analytics instructions for analytics collection by the mobile application, the analytics instructions being modifiable without modification to the mobile application, thereby enabling dynamic analytics configuration on the mobile device, collect analytics data at the mobile device in accordance with the analytics instructions from the analytics configuration file; and send the collected analytics data to an analytics server identified by the mobile application.

9. The apparatus of claim 8, wherein the analytics configuration file comprises analytics instructions defining a first plurality of analytics to be collected from the mobile application.

10. The apparatus of claim 9, further comprising computer-readable instructions that, when executed by the at least one processor, cause the apparatus to access a modified analytics configuration file with modified analytics instructions to collect a second plurality of analytics, wherein the modified configuration file is modified without modification or redeployment of the mobile application.

11. The apparatus of claim 9, wherein the mobile application links to an analytics library, which mobile application causes the analytics library to use a Universal Resource Locator (URL) that defines a location of the analytics configuration file and to use a URL that defines a location of where to send the collected analytics data.

12. The apparatus of claim 9, wherein the analytics instructions specify one or more events to capture and a data to be collected when the specified one or more events is captured.

13. The apparatus of claim 8, further comprising computer-readable instructions that, when executed by the at least one processor, cause the apparatus to collect analytics data by:

determining whether a captured event is an event specified in the analytics configuration file; and retrieving data associated with the event when the captured event is an event specified in the analytics configuration file.

14. The apparatus of claim 13, wherein retrieving data associated with the event comprises:

verifying that the captured event is a touch event;

determining if a view controller for the captured event matches an object specified in the analytics configuration file;

retrieving a reference to the object;

verifying that the object comprises the analytics data specified in the analytics configuration file; and retrieving the specified analytics data specified in the analytics configuration file.

15. A computer implemented method comprising:

accessing, by a mobile application executed on a mobile device, an analytics configuration file from a location specified by an analytics library of the mobile application and remote from the mobile device that executes the mobile application, wherein the analytics configuration file comprises instructions for collecting a first plurality of analytics by the mobile application;

collecting analytics data at the mobile device in accordance with the instructions from the analytics configuration file; and sending the collected analytics data to an analytics server specified by the analytics library.

16. The method of claim 15, further comprising;

accessing a modified analytics configuration file, comprising a second plurality of analytics to be collected from the mobile application;

collecting analytics data in accordance with the modified analytics configuration file; and sending the collected analytics data to the analytics server specified by the analytics library.

17. The method of claim 16, wherein accessing the modified analytics configuration does not require updating of the mobile application or the analytics library.

18. The method of claim 15, wherein collecting analytics data comprises:

determining whether a captured event is an event specified in the analytics configuration file; and retrieving data associated with the event when the captured event is an event specified in the analytics configuration file.

19. The method of claim 18, wherein determining whether the captured event is an event specified in the analytics configuration file comprises:

receiving a captured event;

verifying that the captured event corresponds to a touch event;

determining if an element being selected is a user-interface button;

retrieving a reference to an object associated with the user-interface button;

verifying that the object comprises a property label; and verifying that the property label matches a label in the analytics configuration file to determine that the captured event is an event for which analytics data is to be collected.

20. The method of claim 18, wherein retrieving data associated with the event comprises:

verifying that the captured event is a touch event;

determining if a view controller for the captured event matches an object specified in the analytics configuration file;

retrieving a reference to the object;

verifying that the object comprises the analytics data specified in the analytics configuration file; and retrieving the specified analytics data specified in the analytics configuration file.

* * * * *